J. A. LUTHY.
IDENTIFICATION TAG.
APPLICATION FILED JULY 24, 1917.
1,277,967.
Patented Sept. 3, 1918.
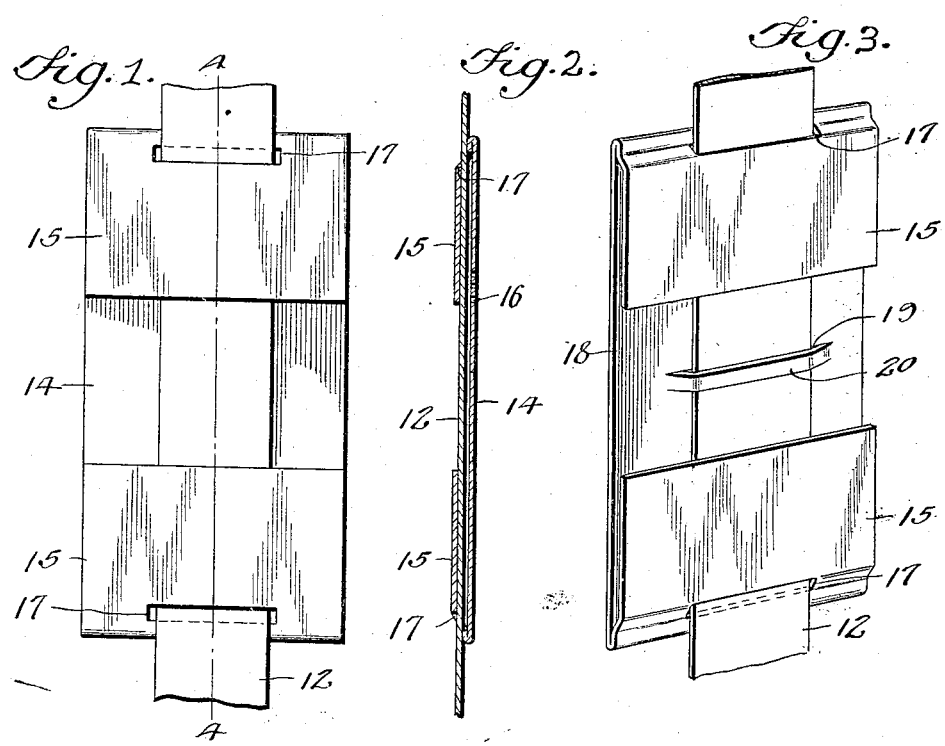
WITNESSES
INVENTOR
J. A. Luthy,
BY Victor J. Evans
ATTORNEY

UNITED STATES PATENT OFFICE.

JOSEPH ANTON LUTHY, OF AUSTIN, TEXAS.

IDENTIFICATION-TAG.

1,277,967.  Specification of Letters Patent.  Patented Sept. 3, 1918.

Application filed July 24, 1917. Serial No. 182,503.

*To all whom it may concern:*

Be it known that I, JOSEPH ANTON LUTHY, a citizen of Switzerland, residing at Austin, in the county of Travis and State of Texas, have invented new and useful Improvements in Identification-Tags, of which the following is a specification.

This invention relates to identification tags such as are generally employed with bale ties. These tags are made from cardboard or other inflammable material, and are oftentimes destroyed by fire. This results in considerable trouble and inconvenience to those who keep records of the number of bales in the warehouse or the like, inasmuch as each tag contains indicia dealing with the number of the bale, the particular material of which the bale was composed, and in some instances the name of those to whom the bales are consigned.

The present invention aims to eliminate these objections by providing a metallic tag designed to accommodate itself to the tie, the tag having the indicia representing the particular material from which the bale is composed, and the number of the bale stamped or cut therefrom.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views wherein:

Figure 1 is a view of a modified form of the invention.

Fig. 2 is a sectional view taken on line 4—4 of Fig. 3.

Fig. 3 is a view of a still further modified form of the invention.

In accordance with my invention, the tag 14 is constructed from a single length of metal, having its extremities 15 bent toward each other and against one side of the tag with a view of providing rounded edges to prevent injury to the hands of those making use of such tags. The body portion 14 of the tag has the indicia 16 stamped thereon or cut therefrom in the manner above set forth, while each extremity 15 is provided with a transverse slot 17 disposed in close proximity to the fold line of the extremity and in parallelism therewith. The slots 17 permit of the tag being slipped upon the bale tie as will be readily understood.

In Fig. 3 I have disclosed a still further modified form of the invention in which instance the tag is constructed identically in the same manner as described in connection with Figs. 1 and 2, except that the body portion 18 of the tag is cut on spaced parallel lines 19 to provide a resilient strip 20 which is disposed approximately at the center of the body portion of the tag. It might here be stated that the material from which the tags disclosed in all forms of the invention are made, is of a resilient nature so that the tags will remain fixed relatively to the tie when associated therewith, and the strip 20 is provided to assure this positive engagement between the parts. The body portion 18 of the tag disclosed in Fig. 3 is provided with suitable indicia, by stamping or perforating the material in the manner above stated. The tags are not only simple in construction, and cheap to manufacture, but can be easily and conveniently handled during the application of a tag to a bale, or the removal of the same therefrom.

While it is believed that from the foregoing description the nature and advantages of the invention will be readily apparent, I desire to have it understood that I do not limit myself to what is herein shown and described, and that such changes may be resorted to as fall within the scope of the appended claim.

What is claimed is:—

In combination with a bail tie, of an identification tag formed from a single length of metal having its opposite ends bent toward each other and at one side of the tag, whereby the said tag is provided with rounded edges at the ends thereof, each of said end portions being provided with a transverse slot arranged at an appreciable distance inwardly of the said folded line of the metal and through which the tie is extended, and the main body portion of the tag being slit at spaced points to provide a resilient transversely disposed strip adapted to bear against one side of the tie at a point between the ends of the tag.

In testimony whereof I affix my signature.

JOSEPH ANTON LUTHY.

Copies of this patent may be obtained for five cents each, by addressing the "Commissioner of Patents, Washington, D. C."